United States Patent
Tang et al.

(10) Patent No.: US 7,753,331 B2
(45) Date of Patent: Jul. 13, 2010

(54) FLAT DISPLAY DEVICE WITH FOLDABLE SUPPORTING BASE

(75) Inventors: Zheng-Yong Tang, Shenzhen (CN); Ze-Feng Zeng, Shenzhen (CN); Chih-Huang Lien, Miao-Li (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 567 days.

(21) Appl. No.: 11/644,315

(22) Filed: Dec. 21, 2006

(65) Prior Publication Data
US 2007/0152111 A1    Jul. 5, 2007

(30) Foreign Application Priority Data
Dec. 21, 2005    (CN)    ............ 2005 1 0121044

(51) Int. Cl.
*E04G 3/00*    (2006.01)
(52) U.S. Cl. ............ 248/284.1; 248/291.1; 248/292.14; 248/276.1; 16/340; 16/342; 16/343; 16/339
(58) Field of Classification Search ............ 248/346.06, 248/284.1, 287, 291.1, 921, 922, 287.1, 276.1, 248/917, 923; 16/340, 342, 343, 339; 361/681–682, 361/683
See application file for complete search history.

(56) References Cited

U.S. PATENT DOCUMENTS

| | | | |
|---|---|---|---|
| 6,018,847 A * | 2/2000 | Lu | 16/337 |
| 6,502,792 B1 | 1/2003 | Cho et al. | |
| 6,666,422 B1 * | 12/2003 | Lu et al. | 248/291.1 |
| 6,671,928 B2 * | 1/2004 | Huang | 16/340 |
| 6,813,813 B2 * | 11/2004 | Lu et al. | 16/342 |
| 7,082,643 B2 * | 8/2006 | Lu et al. | 16/340 |
| 7,222,396 B2 * | 5/2007 | Lu et al. | 16/340 |
| 7,530,541 B2 * | 5/2009 | Wang et al. | 248/284.1 |
| 2003/0122046 A1 * | 7/2003 | Huong | 248/291.1 |
| 2007/0136995 A1 * | 6/2007 | Hu et al. | 16/340 |
| 2007/0169313 A1 * | 7/2007 | Chen et al. | 16/340 |

FOREIGN PATENT DOCUMENTS

TW    582682 Y    4/2004

* cited by examiner

*Primary Examiner*—J. Allen Shriver
*Assistant Examiner*—Todd M. Epps
(74) *Attorney, Agent, or Firm*—Wei Te Chung

(57) ABSTRACT

A flat display device (2) has a foldable base (25). The flat display device includes a flat panel (21) pivoted to a base by a hinge assembly (23). The panel is capable of rotating with respect to the base between a position and a second position. A third position of the panel with respect to the base is intermediate between the first position and the second position. A first friction force provided by the hinge assembly when the panel rotates between the first position and the third position is smaller than a second friction force provided by the hinge assembly when the panel rotates between the third position and the second position.

20 Claims, 4 Drawing Sheets

FLAT DISPLAY DEVICE WITH FOLDABLE SUPPORTING BASE

BACKGROUND OF THE INVENTION

1. Field of the Invention

The present invention relates to a flat display device, and in particular to a flat display having a foldable supporting base.

2. General Background

Conventional liquid crystal displays (LCDs) requires some mechanisms to adjust display position of the LCD panels and provide best image quality to users. FIG. 4 is a schematic side view of an angle adjusting mechanism 12 of a conventional LCD. The conventional LCD includes an LCD panel 1 disposed on a base 11 through an angle adjusting mechanism 12.

The base has two extending fins 110 and 112. The LCD panel 1 includes an extending portion 13, such as a metal member, pivoted on the fin 110 by a shaft 131 passing through a hole 111 on the first fin 110. The angle adjusting mechanism 12 is a four linkage mechanism, including a member 123 and a bolt-like linkage 121. The connection member 123 is pivoted on the fin 112 with a shaft 120 passing through the hole 113 of the fin 112 and a hole 125 of the connection member 123. The bolt-like member 121 is pivoted on the extending portion 13 by a shaft 131 thereof at one end. The bolt-like member 121 includes two parts, and is capable of extending its length by screwing. When the bolt-like member 121 is screwed into a shorter length condition as shown in FIG. 4, the LCD panel 1 is placed in an upright position. Otherwise, when the bolt-like member 121 is release to a longer length condition as shown in FIG. 5, the LCD panel is adjusted to a tilted position. Therefore, a user can adjust the observation angle for a best image quality.

The conventional angle adjusting mechanism, however, is difficult to change observation angle and may need assistance of tools. Furthermore, the conventional angle adjusting mechanism also restricts the tilt angle of the LCD panel because of the limitations of the four linkage mechanism. Therefore, the LCD panel can not be laid down adjacent to the base to minimize the space of its package.

Hence, there is a need for a better configuration for the angle adjusting mechanism of a LCD.

SUMMARY

One embodiment of the invention provides a flat display device has a foldable base. The flat display device includes a flat panel pivoted to a base by a hinge assembly. The panel is capable of rotating with respect to the base between a fist position and a second position. A third position of the panel with respect to the base is intermediate between the first position and the second position. A first friction force provided by the hinge assembly when the panel rotates between the first position and the third position is smaller than a second friction force provided by the hinge assembly when the panel rotates between the third position and the second position.

The base has a first fin. The panel has a first connection member bolted to the first fin by the hinge assembly. The hinge assembly includes a first friction piece and a second friction piece detachably disposed on a bolt, and abutting to each other. The first friction piece is fixed to the first fin, and the second friction piece is engaged with the bolt and forced to slide with respect to the first friction piece when the panel is rotated between the first position and the second position. The first friction piece has a first notch.

The second friction piece has a knob restricted within the first notch when the panel is rotated to a position between the first position and the third position. The first friction piece has a second notch to restrict the knob when the panel is rotated to the second position. The knob abuts the first friction piece when the panel is rotated between the third position and the second position.

Moreover, the second friction piece has a groove. The first friction piece has a protrusion with respect to the groove and restricted therein when the panel is rotated to a position between the first position and the second position. The hinge assembly further includes a plurality of resilient pieces detachably disposed on the bolt. One of the resilient pieces has a plurality of extending branches pressing to the second friction piece, and enhancing an axial force for the second friction piece when the panel is rotated between the second position and the third position.

In another embodiment of the present invention, the base has a second fin. The panel has a second connection member pivoted on the second fin by a second shaft along a same axis of the hinge assembly.

Furthermore, the flat display device is in a folded mode when the panel is rotated to the second position, and is in an upright mode when the panel is rotated to a position between the first position and the third position. A first included angle between the first position and the third position of the panel with respect to the base is about 5 to 25 degree. A second included angle between the second position and the third position of the panel with respect to the base is about 70 to 90 degree.

A detailed description of embodiments of the present invention is given below with reference to the accompanying drawings.

DETAILED DESCRIPTION

Figure 1:
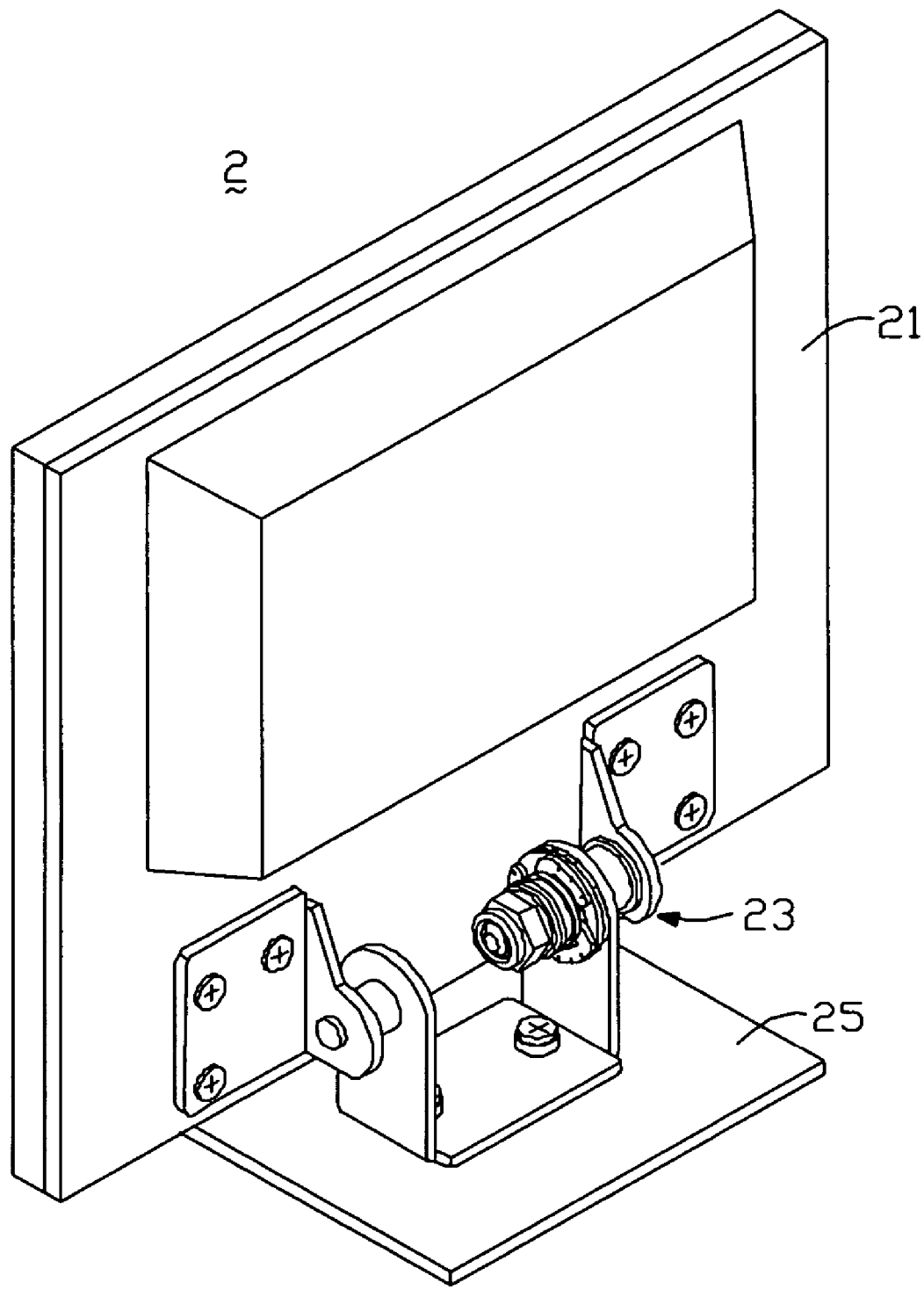
FIG. 1 is an isometric view of the flat display panel in accordance with an embodiment of the present invention viewed from backside and eliminated its outer casing to show the detail profile of its hinge assembly.

FIG. 1 shows a flat display panel 2 in accordance with an embodiment of the present invention viewed from a backside thereof. The flat display device 2 includes a flat display panel 21, such as an LCD panel, rotatably disposed on a base 25 by a connection mechanism 23. For simplicity, an outer casing of the base 25 is omitted to show the detailed structure of the connection mechanism 23.

Figure 2:
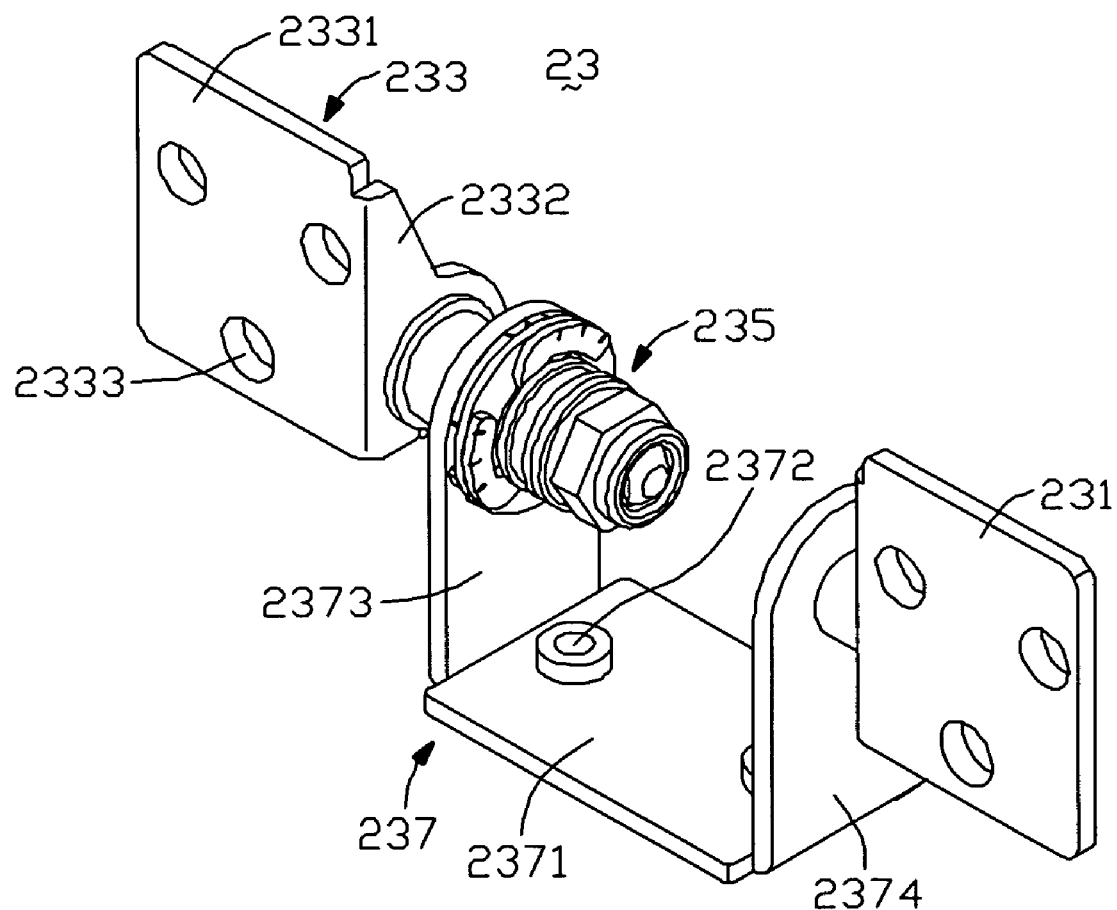
FIG. 2 is an enlarged isometric view of the connection mechanism in another direction of FIG. 1.

FIG 2 is an enlarged isometric view of the connection mechanism 23 viewed in another direction. Referring to FIGS. 1 and 2, the connection mechanism 23 includes a first L-shaped plate 233, a second L-shaped plate 231, and a U-shaped plate 237. Each of the first L-shaped plate 233 and the second L-shaped plate 231 has a main plate 2331 and a perpendicular extending portion 2332. The main plates 2331 of the first L-shaped plate 233 and the second L-shaped plate 231 have a plurality of holes 2333 for screws to secure the first L-shaped plate 233 and the second L-shaped plate 231 to the outer casing of the flat display panel 21. The U-shaped plate 237 has a bottom plate 2371 with two fins 2373, 2374. The bottom plate 2371 has holes 2372 for screws to secure the U-shaped plate 237 to the base 25. The fins 2373, 2374 of the U-shaped plate 237 are parallel to each other and perpendicular to the bottom plate 2371.

Figure 3:
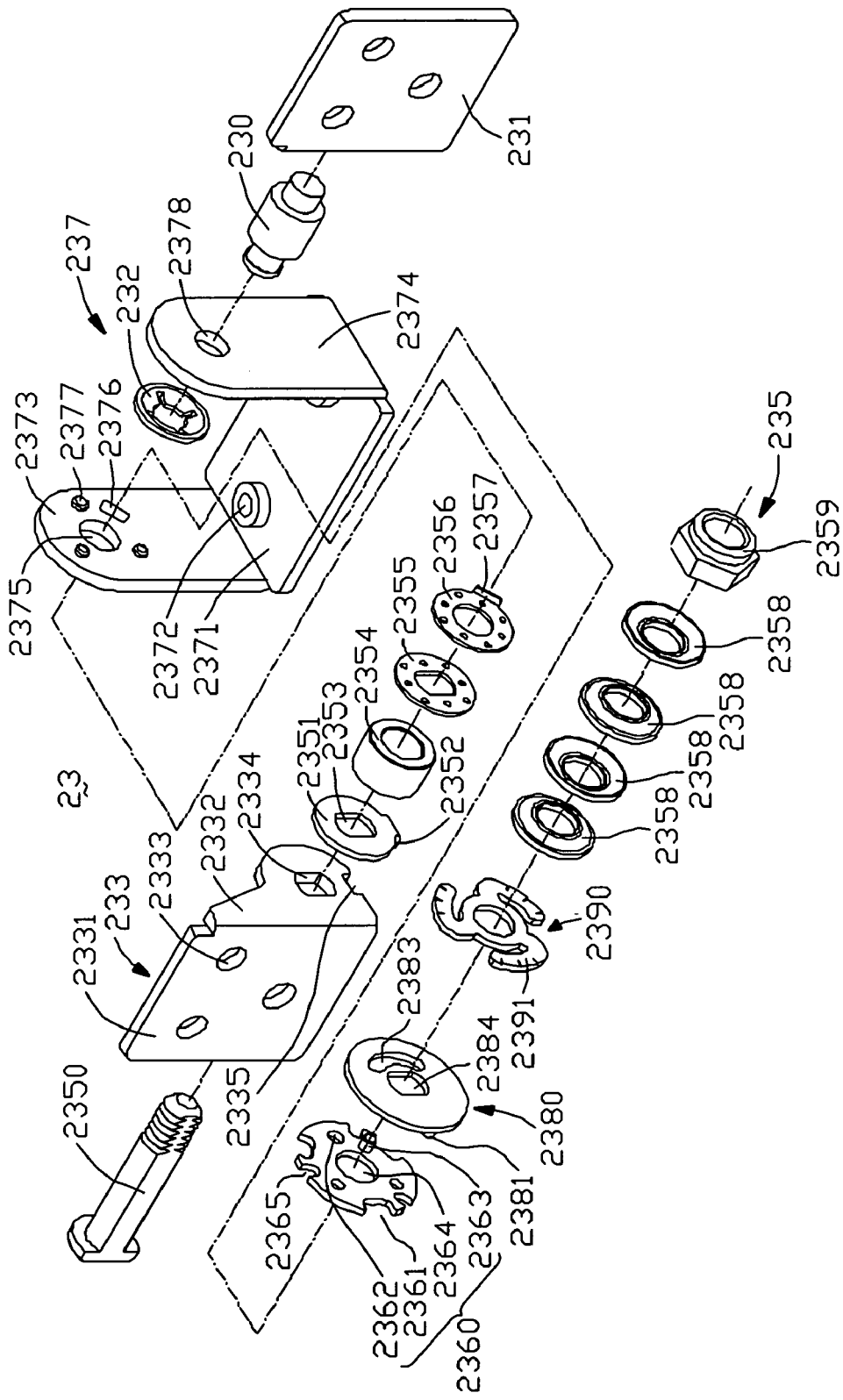
FIG. 3 is an isometric exploded view of the connection mechanism of FIG. 2.
Figure 4:
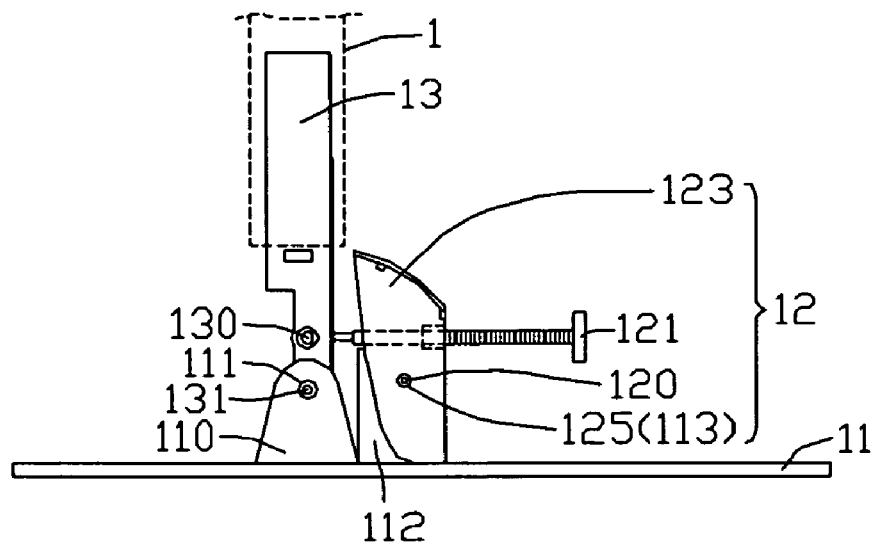
FIG. 4 is a schematic side view of a conventional view angle adjusting mechanism of a liquid crystal display.
Figure 5:
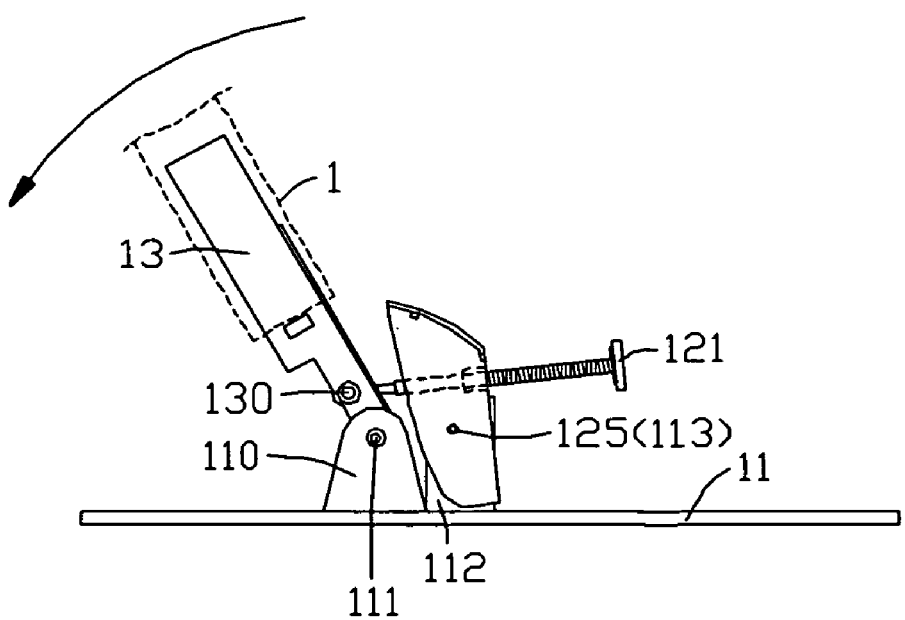
FIG. 5 is another schematic side view showing the view angle adjusting mechanism in FIG. 4 adjusted to another viewing angle.

FIG. 3 is an isometric exploded view of the connection mechanism 23 of FIG. 2. As referring to FIGS. 2 and 3, the first L-shaped plate 233 is pivoted on the fin 2373 by a hinge assembly 235. The second L-shaped plate 231 is pivoted on the fin 2374 by a shaft 230.

The hinge assembly 235 includes a bolt 2350, a nut 2359, and a plurality of pieces therebetween to provide required friction force thereof. The bolt 2350 has two opposite cutting portions (not labeled), and its cross section is substantially rectangular, but has two opposite round edges. When assembling the hinge assembly 235, the bolt 2350 sequentially penetrates a hole 2334 of the extending portion 2332 of the first L-shaped plate 233. The hole 2334 has the same shape of the cross section of the bolt 2350, such that the bolt 2350 is engaged with the first L-shaped plate 233 and acts as a follower of the first L-shaped plate 233.

A spacer 2351 having a key 2352 and a center hole 2353 is then put on the bolt 2350. The shape of the hole 2353 is similar to the hole 2334, and the key 2352 is aligned with a notch 2335 of the extending portion 2332, such that the spacer 2351 is engaged with the bolt 2350 and the first L-shaped plate 233.

A sleeve 2354 and two friction pieces 2355, 2356 are then sequentially put on the bolt 2350. The sleeve 2354 provides a proper gap between the first L-shaped plate 233 and the fin 2373 of the U-shaped plate 237. The friction piece 2356 has a circular center hole (not labeled) and a key 2357 aligned to an opening 2376 of the fin 2373, such that the friction piece 2356 remains static when the first L-shaped plate 233 rotates. The friction piece 2355 has a center hole (not labeled) with its shape similar to the cross section of the bolt 2350. The friction piece 2355 is engaged with the bolt 2350, and is forced to rotate as a follower when the first L-shaped plate 233 rotates, which can provide required friction force of the hinge assembly. Furthermore, the friction pieces 2355, 2356 both have dots (not labeled) on their surface. Rough surfaces of the friction pieces 2355, 2356 can increase required friction force of the hinge assembly 235.

At the other side of the fin 2373, two additional friction pieces 2360, 2380, and a plurality of resilient pieces 2390, 2358 are provided. The friction piece 2360 has a circular center hole 2364, a protrusion 2363, a plurality of first notches 2361, second notches 2365, and holes 2362. For simplicity, the friction piece 2360 of this exemplary embodiment only has three, but is not limited to, first notches 2361, second notches 2365, and holes 2362. The friction piece 2360 is then put on the bolt 2350 through the center hole 2364. The three holes 2362 of the friction piece 2360 are aligned the three protrusions 2377 on the fin 2373 of the U-shaped plate 237. Simultaneously, the friction piece 2360 is engaged with the fin 2373.

The friction piece 2380 has a center hole 2384, a groove 2383 corresponding to the protrusion 2363, and three knobs 2381 corresponding to the three first notches 2361 of the friction piece 2360. The friction piece 2380 is then put on the bolt 2350 through the center hole 2384. The three knobs 2381 of the friction piece 2380 are aligned to the three first notches 2361 of the friction piece 2360, and the protrusion 2363 of the friction piece 2360 is aligned to the groove 2383 of the friction piece 2380. The center hole 2384 of the friction piece 2380 has similar shape of the cross section of the bolt 2350, such that the friction piece 2380 can be rotated following the first L-shaped plate 233.

A star-like resilient piece 2390, and four circular resilient pieces 2358 are sequentially put on the bolt. The star-like resilient piece 2390 has three extending branches 2391 corresponding to the knobs 2381 of the friction piece 2380. The nut 2359 is then applied to fasten the hinge assembly 235 and provide sufficient axial force for the hinge assembly 235.

The second L-shaped plate 231 is simply pivoted on the fin 2374 by a shaft 230 through the hole 2378 thereon and along the same axis of the hinge assembly 235. The shaft 230 is then fixed on the fin 2374 by an O-shaped resilient clamp 232 at the other end thereof. Thus the assemble steps of the connection mechanism 23 in accordance with this embodiment of the present invention is finished.

Referring to FIGS. 1 to 3, because the protrusion 2363 of the friction piece 2360 is restricted within the groove 2383 of the friction piece 2380, the flat display panel 21 is restricted to rotate with respect to the base 25 between a first position (an upright position or in an operation mode) and a second position (a folded position). That is, the flat display panel 21 is substantially perpendicular to the base 25 when it is placed in the first position or an operation position, and the flat display panel 21 is substantially parallel to the base 25 when it is placed in the second position (the folded position). Furthermore, the knobs 2381 of the friction piece 2380 are restricted within the first notches 2361 of the friction piece 2360, such that the flat display panel 21 can be freely rotated within the first position and an intermediate third position between the first position and the second position corresponding to the first notches 2361 under a sufficient rotating torque.

Because the height of the protrusion 2363 of the friction piece 2360 is higher than the knobs 2381 of the friction piece 2380, the knobs 2381 jump out of the first notches 2361, pressing on the surface of the friction piece 2360, when a larger rotating torque is applied to the flat display panel 21. If the rotating torque continues to be applied, the knobs 2381 then enter the second notch 2365 and are stocked therein. Simultaneously, the flat display panel 21 is rotated to the second position (the folded position).

Because of the thee extending branches 2391 of the star-like resilient piece 2390, a first friction force provided by the hinge assembly 235 when the flat display panel 21 rotates between the first position and the third position is smaller than a second friction force provided by the hinge assembly 235 when the flat display panel 21 rotates between the third position and the second position. Furthermore, a first included angle between the first position and the third position of the flat display panel 21 with respect to the base 25 is about 5 to 25 degrees. A second included angle between the second position and the third position of the flat display panel 21 with respect to the base 25 is about 70 to 90 degrees.

The flat display device 2 of the exemplary embodiment of the present invention is capable of adjusting observation angle in a required small region for users, and has a foldable base, which can save space when it is not in use. Moreover, the profile of its package is smaller then that of a conventional flat display device 1. Thus the package material and shipping cost can be greatly reduced.

While the above description has been by way of examples and in terms of preferred embodiments, it is to be understood that the invention is not limited thereto. To the contrary, the above description is intended to cover various modifications and similar arrangements (as would be apparent to those skilled in the art). Therefore, the scope of the appended claims should be accorded the broadest interpretation so as to encompass all such modifications and similar arrangements.

We claim:

1. A flat display device, comprising:
   a base having a first fin;
   a hinge assembly comprising a first friction piece and a second friction piece detachably disposed on a bolt and abutting each other; and
   a panel having a first connection member bolted to the first fin by the hinge assembly, and rotating with respect to the base between a first position and a second position;
   wherein the second friction piece has a groove, and the first friction piece has a protrusion restricted within the groove when the panel is rotated to any position between the first position and the second position.

2. The flat display device as claimed in claim 1, wherein the base has a second fin, and the panel has a second connection member pivoted on the second fin by a shaft along a rotation axis direction of the hinge assembly.

3. The flat display device as claimed in claim 1, wherein the flat display device is in a folded mode when the panel is rotated to the second position.

4. The flat display device as claimed in claim 1, wherein a third position of the panel with respect to the base is intermediate between the first position and the second position, and a first friction force provided by the hinge assembly when the panel rotates between the first position and the third position is smaller than a second friction force provided by the hinge assembly when the panel rotates between the third position and the second position.

5. The flat display device as claimed in claim 4, wherein the first friction piece is fixed to the first fin, and the second friction piece is engaged with the bolt and forced to slide with respect to the first friction piece when the panel is rotated between the first position and the second position.

6. The flat display device as claimed in claim 5, wherein the first friction piece has a first notch, and the second friction piece has a knob restricted within the first notch when the panel is rotated to any position between the first position and the third position.

7. The flat display device as claimed in claim 6, wherein the first friction piece has a second notch to restrict the knob when the panel is rotated to the second position.

8. The flat display device as claimed in claim 6, wherein the knob abuts the first friction piece when the panel is rotated between the third position and the second position.

9. The flat display device as claimed in claim 4, wherein the hinge assembly further includes a plurality of resilient pieces detachably disposed on the bolt.

10. The flat display device as claimed in claim 9, wherein one of the resilient pieces has a plurality of extending branches pressing the second friction piece, and enhancing an axial force for the second friction piece when the panel is rotated between the second position and the third position.

11. The flat display device as claimed in claim 4, wherein a first included angle between the first position and the third position of the panel with respect to the base is in the range from about 5 degrees to about 25 degrees.

12. The flat display device as claimed in claim 11, wherein a second included angle between the second position and the third position of the panel with respect to the base is in the range from about 70 degrees to about 90 degrees.

13. The flat display device as claimed in claim 4, wherein the flat display device is in an upright mode when the panel is rotated to any position between the first position and the third position.

14. A flat display device, comprising:
    a base comprising a fin;
    a hinge assembly comprising a bolt, a first friction piece, and a second friction piece, the first friction piece and the second friction piece detachably disposed on the bolt and abutting each other; and
    a panel having a connection member bolted to the fin by the hinge assembly, and rotating with respect to the base between an upright position and a folded position;
    wherein the first friction piece comprises a protrusion and is fixed to the fin, the second friction piece comprises a groove and is engaged with the bolt, and the protrusion of the first friction piece is restricted within the groove of the second friction piece when the panel is rotated to any position between the upright position and the folded position.

15. The flat display device as claimed in claim 14, wherein the first friction piece comprises a first notch and a second notch, the second friction piece comprises a knob, the knob is restricted within the first notch when the flat display device is in an operation mode, and the knob is restricted within the second notch when the panel is rotated to the folded position.

16. The flat display device as claimed in claim 15, wherein a height of the protrusion of the first friction piece is larger than that of the knob of the second friction piece.

17. The flat display device as claimed in claim 16, wherein the hinge assembly further comprises a star-like resilient piece disposed on the bolt, and the star-like resilient piece comprises a plurality of extending branches pressing the second friction piece.

18. The flat display device as claimed in claim 17, wherein the hinge assembly further comprises a nut corresponding to the bolt, and the first friction piece, the second friction piece and the star-like resilient piece are disposed between the fin and the nut.

19. The flat display device as claimed in claim 14, wherein the connection member comprises a hole and a notch, the bolt extends through the hole of the connection member, the hinge assembly further comprises a spacer, the spacer comprises a key engaged in the notch of the connection member and a hole similar to the hole of the connection member, and the bolt also extends through the hole of the spacer such that the spacer is engaged with the bolt and the connection member.

20. The flat display device as claimed in claim 19, wherein the hinge assembly further comprises a sleeve around the bolt, and the sleeve and the spacer are disposed between the fin and the connection member.

* * * * *